United States Patent

Terazawa et al.

[11] Patent Number: 5,851,057
[45] Date of Patent: Dec. 22, 1998

[54] VEHICLE BRAKE CONTROL UNIT

[75] Inventors: Tadashi Terazawa; Michiharu Nishii, both of Aichi, Japan

[73] Assignee: Aisin Seiki Kabushiki Kaisha, Kariya, Japan

[21] Appl. No.: 670,429

[22] Filed: Jun. 26, 1996

[30] Foreign Application Priority Data

Jul. 13, 1995 [JP] Japan ..................................... 7-177108

[51] Int. Cl.[6] ................................................ B60T 13/66
[52] U.S. Cl. ..................... 303/155; 303/113.4; 303/114.1
[58] Field of Search ................................. 303/114.1, 155, 303/113.4, 9, 117.1, 113.3, 116.1, 116.2

[56] References Cited

U.S. PATENT DOCUMENTS

| | | | |
|---|---|---|---|
| 4,655,512 | 4/1987 | Leiber ................................... | 303/113.4 |
| 5,054,860 | 10/1991 | Nomura et al. .......................... | 188/358 |
| 5,505,526 | 4/1996 | Michels .................................... | 303/155 |
| 5,564,797 | 10/1996 | Steiner et al. ........................... | 303/176 |
| 5,584,542 | 12/1996 | Klarer et al. ............................. | 303/155 |

FOREIGN PATENT DOCUMENTS 6-191395  7/1994  Japan .

*Primary Examiner*—Matthew C. Graham
*Attorney, Agent, or Firm*—Burns, Doane, Swecker & Mathis, LLP

[57] ABSTRACT

A vehicle brake control unit includes a cylinder body (2); a spool member (18) which is slidably provided in the cylinder body (2), and has one end portion confronted with a pressure chamber (10) and the other end portion confronted with a regulator pressure chamber (24) in the cylinder body, the spool member being axially moved by both the pressure in the pressure chamber and the pressure in the regulator pressure chamber, thus adjusting the pressure of a pressure source (26) which is applied to a regulator port (2a) formed in the cylinder body. The pressure provided at the regulator port is led into the regulator pressure chamber and supplied to the wheel cylinders (33, 34, 35 and 36). The vehicle brake control unit further includes emergency-braking-operation detecting unit (65) for detecting an emergency braking operation, and brake pressure change-over unit (62, or 66 and 68) for communicating the pressure source with the wheel cylinders when the emergency-braking-operation detecting unit detects an emergency braking operation.

3 Claims, 3 Drawing Sheets

VEHICLE BRAKE CONTROL UNIT

BACKGROUND OF THE INVENTION

1. Field of the Invention

This invention relates to a vehicle brake control unit that applies hydraulic pressure to vehicle wheel brakes.

2. Description of the Prior Art

A conventional hydraulic pressure brake device for vehicles which detects a driver's emergency braking operation to increase a braking force, has been disclosed by Japanese Patent Unexamined Publication No. Hei 6-191395. The conventional hydraulic pressure brake unit is designed as follows: Upon detection of an emergency braking operation performed by the driver on a vehicle, the pressure receiving area of an elastic reaction member of a vacuum booster, which is adapted to transmit the braking force, is decreased, to thereby increase the servo ratio of the vacuum booster, with the results that at the time of the emergency braking operation, a braking distance is decreased when compared with that at the time of the normal braking operation.

In the above-describe prior art, it is essential to provide a plunger for varying the servo ratio, and a solenoid for driving the plunger in the vacuum booster, and therefore it is necessary to greatly modify the structure of the vacuum booster. Hence, the prior art suffers from such a problem that it is high in manufacturing costs.

SUMMARY OF THE INVENTION

The present invention has been made in view of the above circumstances, and therefore an object of the invention is to provide a vehicle brake control unit which is obtained by modifying the arrangement of a conventional braking unit to a minimum, to increase the braking force at the time of an emergency braking operation.

In order to solve the above object, according to a first aspect of the invention, there is provided a vehicle brake control unit which comprises:

braking booster means for adjusting a pressure from a pressure source adapted to generate a pressure independently of the operation of a brake operating member according to a force applied to the brake operating member, and for applying the pressure thus adjusted to wheel brakes;

emergency-braking-operation detecting means for detecting an emergency braking operation; and brake pressure change-over means for communicating the pressure source with the wheel brakes when the emergency-braking-operation detecting means detects the emergency braking operation.

According to a second aspect of the invention, in the vehicle brake control unit, the braking booster means comprises: a cylinder body into which a pressure is led from the pressure source; a regulator chamber formed in the cylinder body; a spool member provided in the cylinder body, the spool member receiving a brake operating force on one side thereof, and a pressure in the regulator pressure chamber on the other side thereof, thus being moved axially to adjust the pressure of the pressure source; and a regulator port formed in the cylinder body, to which an adjusted pressure adjusted by the spool member is led, the regulator port being communicated with the wheel brakes, wherein the brake pressure change-over means comprises a change-over valve which is provided between the regulator port and the regulator pressure chamber, and which selectively takes a first position to communicate the regulator pressure chamber with the regulator port, and a second position to communicate the regulator pressure chamber with the outside and to isolate the regulator pressure chamber and the regulator port from each other.

Further, according to a third aspect of the invention, in the vehicle brake control unit, the braking booster means comprises: a cylinder body into which a pressure is led from the pressure source; a regulator chamber formed in the cylinder body; a spool member provided in the cylinder body, the spool member receiving a brake operating force on one side thereof, and a pressure in the regulator pressure chamber on the other side thereof, thus being moved axially to adjust the pressure of the pressure source; and a regulator port formed in the cylinder body, to which an adjusted pressure adjusted by the spool member is led, the regulator port being communicated with the wheel brakes, wherein the brake pressure change-over means comprises a change-over valve which selectively takes a first position to communicate the wheel brakes with the regulator port and to isolate the wheel brakes from the pressure source, and a second position to communicate the wheel brakes with the pressure source, and to isolate the wheel brakes from the regulator port.

The vehicle brake control unit according to the first aspect of the invention operates as follows: When the vehicle driver carries out an emergency braking operation, the emergency-braking-operation detecting means detects it, so that the brake pressure change-over means operates to communicate the pressure source to the wheel brakes, thus increasing the braking force.

The vehicle brake control unit according to the second aspect of the invention operates as follows: When the emergency-braking-operation detecting means detects an emergency braking operation, the change-over valve operates to communicate the regulator pressure chamber with the outside (atmospheric pressure) and simultaneously to isolate the regulator pressure chamber from the regulator port, so that the spool member is quickly moved whereby the pressure source is communicated with the wheel brakes, thus increasing the braking force.

The vehicle brake control unit according to the third aspect of the invention operates as follows: When the emergency-braking-operation detecting means detects an emergency braking operation, the change-over valve operates to communicate the wheel brakes with the pressure source and simultaneously to isolate the wheel brakes from the regulator pressure chamber, thus increasing the braking force.

The above and other objects and features of the present invention will be more apparent from the following description taken in conjunction with the accompanying drawings.

DETAILED DESCRIPTION OF THE PREFERRED EMBODIMENTS

Now, a description will be given of embodiments of the invention with reference to the accompanying drawings.

Figure 1:
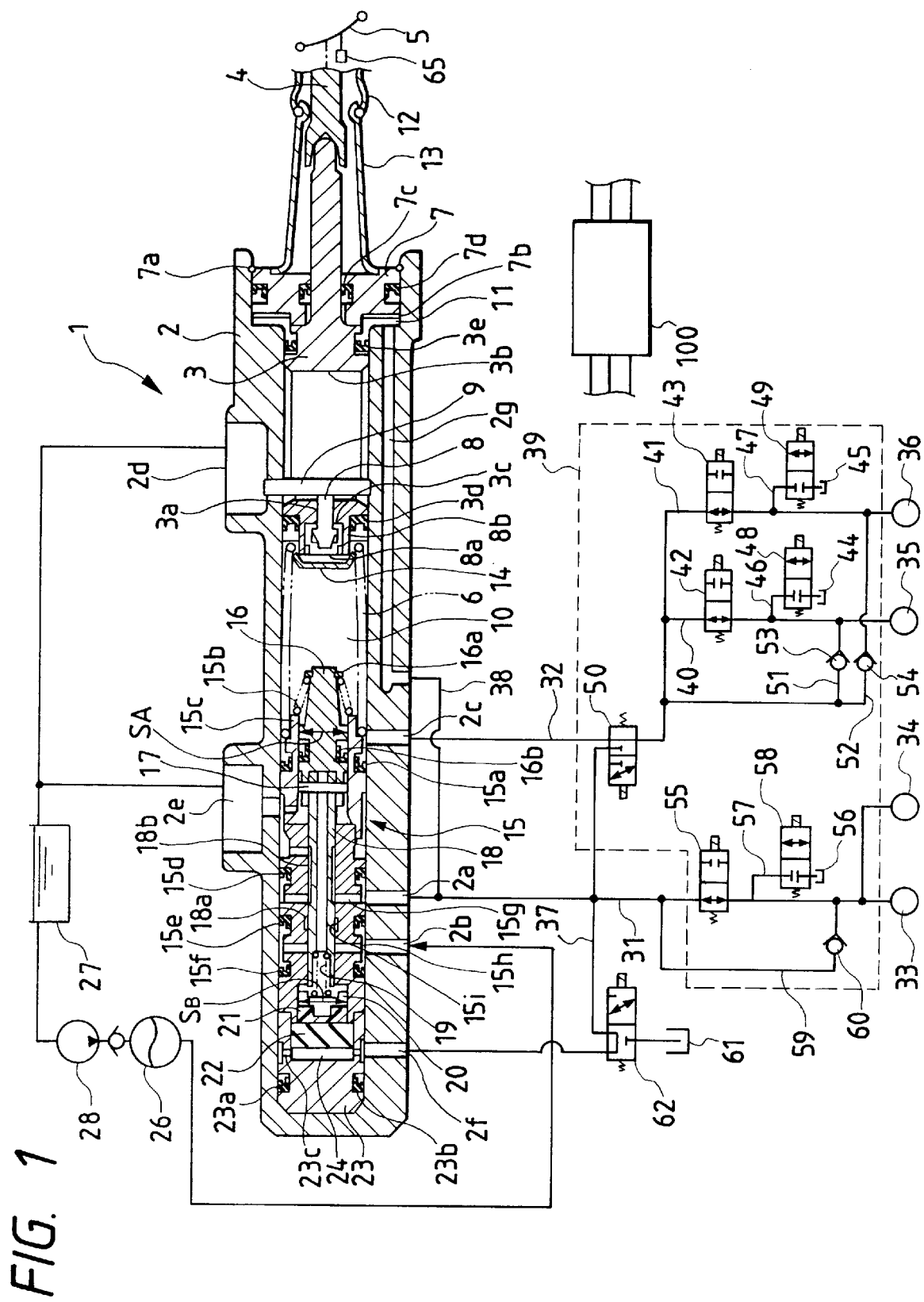
FIG. 1 is a systematic diagram showing a vehicle brake control unit according to a first embodiment of the invention.

FIG. 1 is a systematic diagram showing a vehicle brake control unit according to a first embodiment of the invention.

In FIG. 1, reference numeral 1 designates a hydraulic booster forming the vehicle brake control unit of the invention. The hydraulic booster 1 includes a cylinder body 2 in which a first piston 3 is slidably provided. The first piston 3 is coupled through a push rod 4 to a brake pedal 5 on which a stroke sensor 65 is provided to detect a stroke of the brake pedal 5. The first piston 3, being urged by a return spring 6, is abutted against a sleeve 7, and positioned with a snap ring 7a. A stopper 7b is provided in front of the sleeve 7, to prevent the latter 7 from being moved forwardly. The first piston 3 has a communicating hole 3a, into which an inlet valve 8 is inserted. The inlet valve 8 is urged by a valve spring 8a. Hence, when the first piston 3 is inoperative, the inlet valve 8 is fixed to the cylinder body 1, and abutted against a pin 9 which is inserted into a through hole 3b formed in the first piston 3. Under this condition, the valve section 8b of the inlet valve 8 is not abutted against a valve surface 3c of the piston 3; that is, the inlet valve 8 is open. A seal cup 3d is mounted on the front end portion of the first piston 3, whereas another seal cup 3e is mounted on the rear end portion of the first piston 3. An inside-diameter seal 7c and an outside-diameter seal 7d are mounted on the sleeve 7. With these seals 7c and 7d, a pressure chamber 10 is formed in front of the first piston 3, and an auxiliary pressure chamber 11 is formed in the rear of the first piston 3 being defined by the sleeve 7.

Further in FIG. 1, reference numeral 12 designates a boot that isolates the hydraulic brake device 1 from the outside; 13, a retainer that supports the boot 12 and regulates the radial movement of the push rod 4; and 14, a cup retainer that allows the aforementioned return spring 6 to engage with the first piston 3, and prevents the seal cup 3d from coming off the first piston 3.

Furthermore in FIG. 1, reference numeral 15 designates a sleeve member. The right end of the sleeve member 15, being urged by the return spring 6, is abutted against the bottom of the cylinder body 2. A seal member 15a is mounted on the sleeve member 15, to thereby form the aforementioned pressure chamber 10 in cooperation with the first piston 3. A second piston 16 is slidably inserted in the sleeve member 15 in such a manner that it is abutted against a stopper 15c while being urged to the right of the sleeve member 15 by a piston spring 15b locked to a snap ring 16a,, thus being positioned. The second piston 16 has a cut seal 16b to define the aforementioned pressure chamber 10, and is slidable to the left (in FIG. 1) upon receiving a pressure from the pressure chamber 10. The second piston 16 is coupled through a pin 17 to a spool valve 18, so that the latter 18 is moved together with the second piston 16.

A piston return member 20 is provided through a spring 19 on the left end portion of the spool valve 18. The piston return member 20 is coupled to a trapezoidal engaging member 21 that forms regulating means. The engaging member 21, being urged by the aforementioned spring 19, is abutted against an elastic member 22 which is made of rubber or the like, thus forming the regulating means. Further in FIG. 1, reference numeral 23 designates a member for preventing the movement of the sleeve member 15 (hereinafter referred to as "a movement preventing member 23"). The member 23 is secured to the sleeve member 15. The movement preventing member 23 has a seal member 23a, and communicating holes 23b and 23c. In this example, a regulator pressure chamber 24 is defined between the elastic member 22 and the movement preventing member 23.

The sleeve member 15 has seals members 15d, 15e and 15f, in addition to the above-described seal member 15a, in the stated order as viewed in a right-to-left direction in FIG. 1. Between the seal members 15d and 15e is formed an outlet port 15g connected to a main pipe line 21 which is coupled to a wheel brake 33 provided for the left rear wheel of the vehicle and to a wheel brake 34 provided for the right rear wheel. Between the seal members 15e and 15f is formed an inlet port 15h to which brake fluid is led from accumulator 26 that accumulates the brake fluid under pressure. The brake fluid is supplied from a reservoir tank 27 to the accumulator 26 by a pump 28 while being pressurized. The outlet port 15g and the inlet port 15h of the sleeve member 15 are connected to ports 2a and 2b formed in the cylinder body 2, respectively. The cylinder body 2 further has a port 2c which is connected to a main pipe line 32 which is connected both to a wheel brake 35 provided for the left front wheel and to a wheel brake 36 provided for the right front wheel. The cylinder body 2 has two inlet ports 2d and 2e that communicate with the reservoir tank 27.

The aforementioned spool valve 18 has first and second slits 18a and 18b in its cylindrical outer surface, while the sleeve member 15 has a slit 15i similarly. The port 2a formed in the cylinder body 2 (hereinafter referred to as "a regulator port 2a") is connected through a regulator pipe line 37 to a port 2f which is communicated with the aforementioned regulator pressure chamber 24. The port 2a is further connected through a feedback pipe line 38 to a communicating hole 2g which is communicated with the aforementioned auxiliary pressure chamber 11.

Now, a pressure control device 39 provided between the above-described hydraulic booster 1 and the wheel brakes 33 to 36 will be described. The front wheel brakes 35 and 36 are connected respectively through pressure intensifying pipe lines 40 and 41 to the main pipe line 32. Those pressure intensifying pile pines 40 and 41 have pressure intensifying valves 42 and 43, respectively, which are normally open electromagnetic valves and are operated by a control circuit 100. The pipe line connected between the pressure intensifying valve 42 on the pressure intensifying pipe line 40 and the front wheel brake 35, and the pipe line connected between the pressure intensifying valve 43 on the pressure intensifying pipe line 41 and the front wheel brake 36, are connected through relief pipe lines 46 and 47 to atmospheric pressure reservoirs 44 and 45, respectively. The relief pipe lines 46 and 47 have pressure reducing valves 48 and 49 which are normally closed electromagnetic valves and are also operated by the control circuit 100.

Between the aforementioned port 2c and the pressure intensifying valves 42 and 43 of the main pipe line 32, a change-over valve 50 is provided which is a three-port type electromagnetic valve which is operated by the control circuit 100. The change-over valve 50, when being inoperative, communicates the port 2c, which is communicated with the pressure chamber 10 of the hydraulic booster 1, with the pressure intensifying valves 42 and 43, and isolates those valves 42 and 43 from the regulator port 2a. On the other hand, the change-over valve 50, when being operative, isolates the port 2c from the pressure intensifying valve 42 and 43, and communicates the latter 42 and 43 with the regulator port 2a.

The pipe line between the pressure intensifying valve 42 on the pressure intensifying pipe line 40 and the front wheel brake 35 is connected through a return pipe line 51 to the pipe line between the change-over valve 50 and the pressure intensifying valve 42. Similarly, the pipe line between the pressure intensifying valve 43 on the pressure intensifying pipe line 41 and the front wheel brake 36 is connected through a return pipe line 52 to the pipe line between the change-over valve 50 and the pressure intensifying valve 43. Those return pipe lines 51 and 52 have check valves 53 and 54, respectively. Those valves 53 and 54 permit the flow of operating oil from the respective wheel brakes 35 and 36 towards the hydraulic booster 1, but interrupt the flow of operating oil from the hydraulic booster 1 to the respective wheel brakes 35 and 36.

On the other hand, the main pipe line 31 for the rear wheels has a pressure intensifying valve 55 which is normally open electromagnetic valve and operated by the aforementioned control circuit 100. An atmospheric pressure reservoir 56 is communicated through a relief pipe line 57 with the pipe line connected between the aforementioned pressure intensifying valve 55 on the main pipe line 31 and the wheel brakes 33, 34. The relief pipe line 57 has a pressure reducing valve 58 which is a normally closed electromagnetic valve and operated by the aforementioned control circuit 100.

The aforementioned pipe line between the pressure intensifying valve 55 of the main pipe line 31 and the rear wheel brake 33 (connected to the rear wheel brake 34) is connected through a return pipe line 59 to the pipe line between the regulator port 2a of the hydraulic booster 1 and the aforementioned pressure intensifying valve 55. The return pipe line 59 has a check valve 60. The check valve 60 permits the flow of operating oil from the wheel brakes 33 and 34 toward the hydraulic booster 1, but interrupts the flow of operating oil from the hydraulic booster 1 towards the wheel brakes 33 and 34.

The above-described regulator pipe line 37 has a brake pressure change-over valve 62 which selectively takes a first position to communicate the regulator port 2a with the regulator pressure chamber 24, and a second position to communicate the regulator pressure chamber 24 with an atmospheric pressure reservoir 61, and to isolate the regulator pressure chamber 24 from the regulator port 2a. It normally takes the first position.

Now, the operation of the hydraulic brake device of the invention which is applied to a motor vehicle, will be described.

When the driver operates the brake pedal 5 under a normal condition, the first piston 3 is moved through the push rod 4 to the left in FIG. 1, so that the inlet valve 8 is disengaged from the pin 9. As a result, the valve section 8b of the inlet valve 8, being urged by the valve spring 8a, is abutted against the valve surface 3c of the first piston 3 so that the pressure chamber 10 is isolated from the reservoir tank 27. Thereafter, as the first piston 3 is further moved, the pressure chamber 10 is decreased in volume so that a pressure PM is generated in the pressure chamber 10.

In this operation, the pressure PM generated in the pressure chamber 10 acts on the second piston 16 so that a force PM×SA (where SA is the sectional area of the second piston) is applied to the second piston 16, whereby the latter 16 is moved to the left in FIG. 1. The spool valve 18, being engaged with the second piston 16 through a pin 17, is moved to the left together with the second piston 16, to compress the spring 19, thus being abutted against the piston return member 20. As the spool valve 18 is moved in the above-described manner, the first slit 18a formed in the spool valve 18 is communicated with the inlet port 15h of the sleeve member 15, so that the inlet port 15h is communicated with the slit 15i of the sleeve member 15. At the same time, the second slit 18b of the spool valve 18 is communicated with the slit 15i so that the slit 15i is communicated with the outlet port 15g. That is, when the spool valve 18 is moved to the left in FIG. 1, the inlet port 15h and the outlet port 15g of the sleeve member 15 are communicated with each other. Hence, the inlet port 2b of the cylinder body 2 is communicated with the regulator port 2a of the same 1 through the following path: the inlet port 15h the first slit 18a→ the slit 15i→the second slit 18b→the outlet port 15g. Therefore, the pressure in the accumulator 26 is applied from the regulator port 2a to the regulator pressure chamber 24 through the brake pressure change-over valve 62 and the aforementioned port 2f. The pressure thus applied to the regulator pressure chamber 24 urges the elastic member to the right in FIG. 1, thus moving back the spool valve 18 to the right in FIG. 1 through the engaging member 21 and the piston return member 20 until the forces applied to both ends of the spool valve 18 are balanced with each other. Thus, the regulator pressure has been determined. In this connection, if the loss due to the load of the return spring etc. is disregarded, then the following equation is established:

$$PM \times SA = PR \times SV$$

where PM is the pressure generated in the pressure chamber 10, PR is the pressure which is applied from the accumulator 26 through the spool valve 18, as a regulator pressure, to the regulator pressure chamber 24, and SV is the area of the part of the elastic member 22 which is abutted against the engaging member 21.

Therefore, the pressure applied to the regulator pressure chamber 24, namely, the regulator pressure PR is as follows:

$$PR = PM \times SA/SV$$

Figure 3:
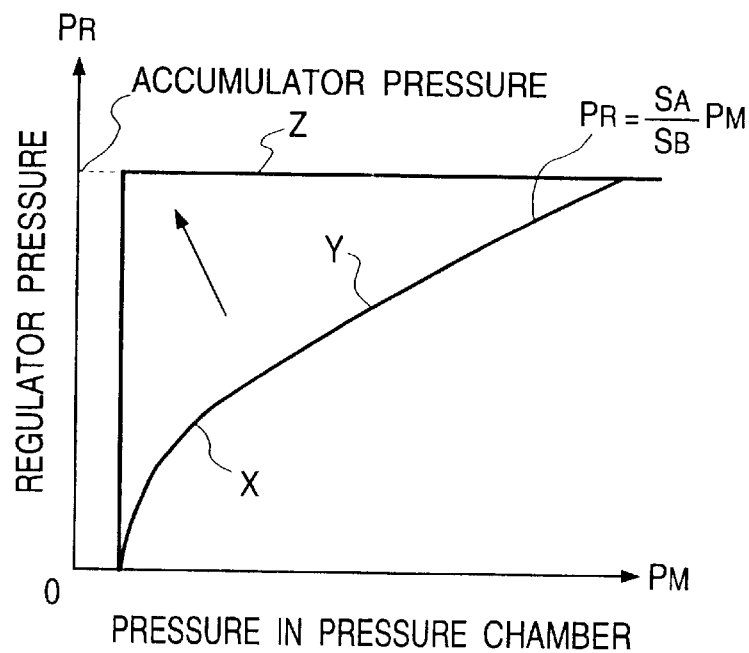
FIG. 3 is a graph showing the characteristics of the vehicle brake control unit according to the invention.

In other words, the regulator pressure PR is the product of the pressure PM in the pressure chamber 10 and the ratio of the sectional area SA of the second piston 16 to the area of the part of the elastic member 22 which is abutted against the engaging member 21. In the case where the pressure in the regulator pressure chamber 24 is relatively low, the force urging the elastic member 22 towards the engaging member 21 is not so high, and therefore the area SV of the part of the elastic member 22 which is abutted against the engaging member 21 is small. However, as the hydraulic pressure in the regulator pressure chamber 24 increases, the area SV is increased. It is increased to at most SB in FIG. 1. Hence, the characteristic curve representing the relation between the pressure PM in the pressure chamber 10 and the regulator pressure PR is moderate as indicated at X in FIG. 3. In the invention, the characteristic curve X may be freely changed by varying the hardness of the elastic member 22, or the configuration of the part of the engaging member 21 which is abutted against the elastic member 22 when compared with the prior art in which as the pressure in the pressure chamber increases, the regulator pressure is straightly increased.

Thereafter, as the pressure PM of the pressure chamber 10 increases, the regulator pressure PR is increased, and finally it is as indicated at Y in FIG. 1. In this case, $$PR = PM \times SA/SB$$

Thereafter, since SA and SB are constant, the regulator pressure PR is straightly increased as the pressure PM of the pressure chamber 10 increases. That is, the setting of the regulator pressure PR (the inclined straight part Y of the characteristic curve in FIG. 3) with respect to the pressure PM produced in the pressure chamber 10 can be freely made by changing the sectional area SA of the second piston 16 and the sectional area SB of the engaging member 21 which is part of the regulating means, whereby the braking power can be freely determined.

The accumulator pressure is adjusted by the spool valve 18, and the regulator pressure PR provided at the regulator port 2a is transmitted through the communicating hole 2g to the auxiliary pressure chamber 11, thus being provided as an input encouraging force acting on the first piston 3 while being applied through the pressure intensifying valve 55 to the rear wheel brakes 33 and 34. The pressure PM generated in the pressure chamber 10 is supplied through the change-over valve 50 and the pressure intensifying valves 42 and 43 to the front wheel brakes 35 and 36.

When the driver operates the brake pedal 5 to apply the braking force to the wheels during traveling on a road low in friction coefficient such as a snow road and a frozen road, the aforementioned control circuit 100 detects the locking of a front wheel from the wheel speed which is detected by a wheel speed sensor (not shown) coupled to the wheel. As a result, the change-over valve 50 is activated to isolate the port 2c communicated with the pressure chamber 10 from the pressure intensifying valves 42 and 43 and simultaneously to communicate the regulator port 2a of the hydraulic booster 1 with the pressure intensifying valves 42 and 43, as a result of which instead of the pressure PM of the pressure chamber 10, the regulator pressure PR adjusted by the spool valve 18 is applied to the front wheel brakes 35 and 36. For instance in the case where the locking of the left front wheel is detected, the pressure intensifying valve 42 is activated; that is, it is closed to isolate the left front wheel brake 35 from the hydraulic booster 1, while the pressure reducing valve 48 is activated; that is, it is opened to communicate the wheel brake 35 through the relieve pipe line 46 with the atmospheric pressure reservoir 44 to discharge the operating fluid from the wheel brake 35 into the atmospheric pressure reservoir 44, to thereby reduce the pressure in the wheel brake 35 (anti-locking control).

When the control circuit 100 detects the fact that the locking of the wheel has been eliminated by decreasing the pressure in the wheel brake 35, the pressure intensifying valve 42 and the pressure reducing valve 43 are placed in the inactive state again, as a result of which the regulator pressure PR is applied from the hydraulic booster 1 through the change-over valve 50 and the pressure intensifying valve 42 to the wheel brake 35.

In the case when the driver of the vehicle suddenly finds an obstacle on the way, he may quickly operate the brake pedal 5 to bring the vehicle to a sudden stop. In this case, the control circuit 100 determines it from the stroke of the brake pedal 5 detected by the stroke sensor 65 coupled to the brake pedal 5 that an emergency braking operation has been carried out. Thereupon, the control circuit 100 operates to cause the brake pressure change-over valve to take the second position, so that the regulator pressure chamber 24 is communicated through the change-over valve 62 to the atmospheric pressure reservoir 61 while the regulator pressure chamber 24 is isolated from the regulator port 2a.

Because of the emergency braking operation; that is, because of the abrupt movement of the first piston 3 coupled to the brake pedal 5, the pressure PM in the pressure chamber 10 is abruptly increased. As a result, the spool valve together with the second piston whose one end portion appears in the pressure chamber 10 is quickly moved a relatively long distance to the left (in FIG. 1). Therefore, the inlet port 2b is communicated with the regulator port 2a, so that the high pressure in the accumulator 26 is applied through the inlet port 2b to the regulator port 2a; however, since the regulator pressure chamber 24 is isolated from the regulator port 2a and communicated with the atmospheric pressure reservoir 61, the spool valve 18 will not be returned to the right in FIG. 1. Hence, the pressure in the accumulator 26, which is applied to the regulator port 2a, is applied through the change-over valve 50 and the pressure intensifying valves 42 and 43 to the front wheel brakes 35 and 36 and through the pressure intensifying valve 55 to the rear wheel brakes 33 and 34, respectively. In this case, as indicated at Z in FIG. 3, the regulator pressure PR is the pressure in the accumulator 26, thus being considerably high when compared with the pressure PM in the pressure chamber 10.

Figure 4:
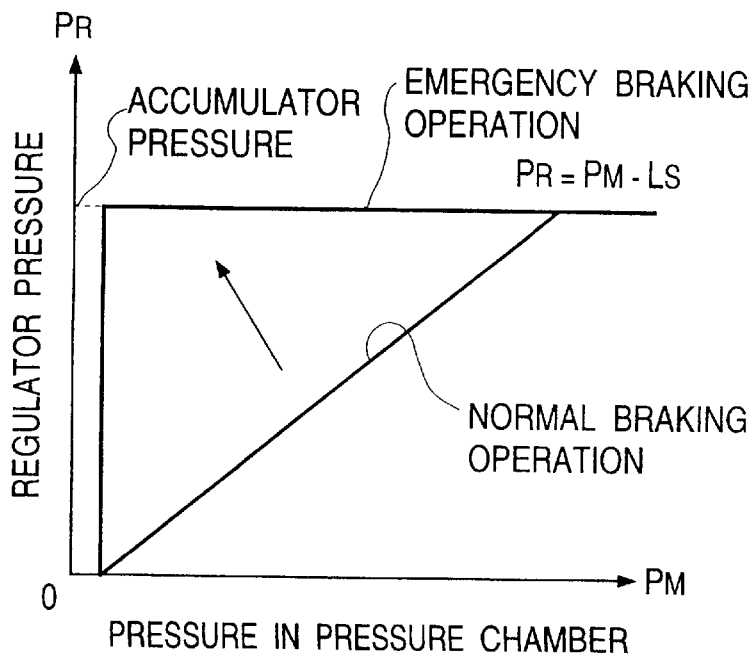
FIG. 4 is a graph showing the characteristics of the vehicle brake control unit according to a modified embodiment of the invention.

In the above-described hydraulic booster 1, in order that the relation between the pressure PM in the pressure chamber 10 and the regulator pressure PR be of non-linear type, the trapezoidal engaging member 21 is provided between the spool valve 18 and the elastic member 22; however, the invention is not limited only to the above-described hydraulic booster 1. That is, it goes without saying that the technical concept of the invention is applicable to a hydraulic booster which is such that the relation between the pressure PM in the pressure chamber 10 and the regulator pressure PR is of linear type. In this case, the relation between the pressure PM in the pressure chamber 10 and the regulator pressure PR is as indicated in FIG. 4. In FIG. 4, LS corresponds to the sum of the assembly loads of the piston spring ring 15b and the spring 19.

When it becomes unnecessary to stop the vehicle, the driver releases the brake pedal 5. Hence, the stroke sensor 65, or a brake switch (not shown) coupled to the brake pedal 5 detects the brake returning operation. Thereupon, the control circuit 100 operates to cause the brake pressure change-over valve 62 to take the first position. As a result, the regulator pressure chamber 24 is communicated through the brake pressure change-over valve 62 with the regulator port 2a, and is isolated from the atmospheric pressure reservoir 61.

Figure 2:
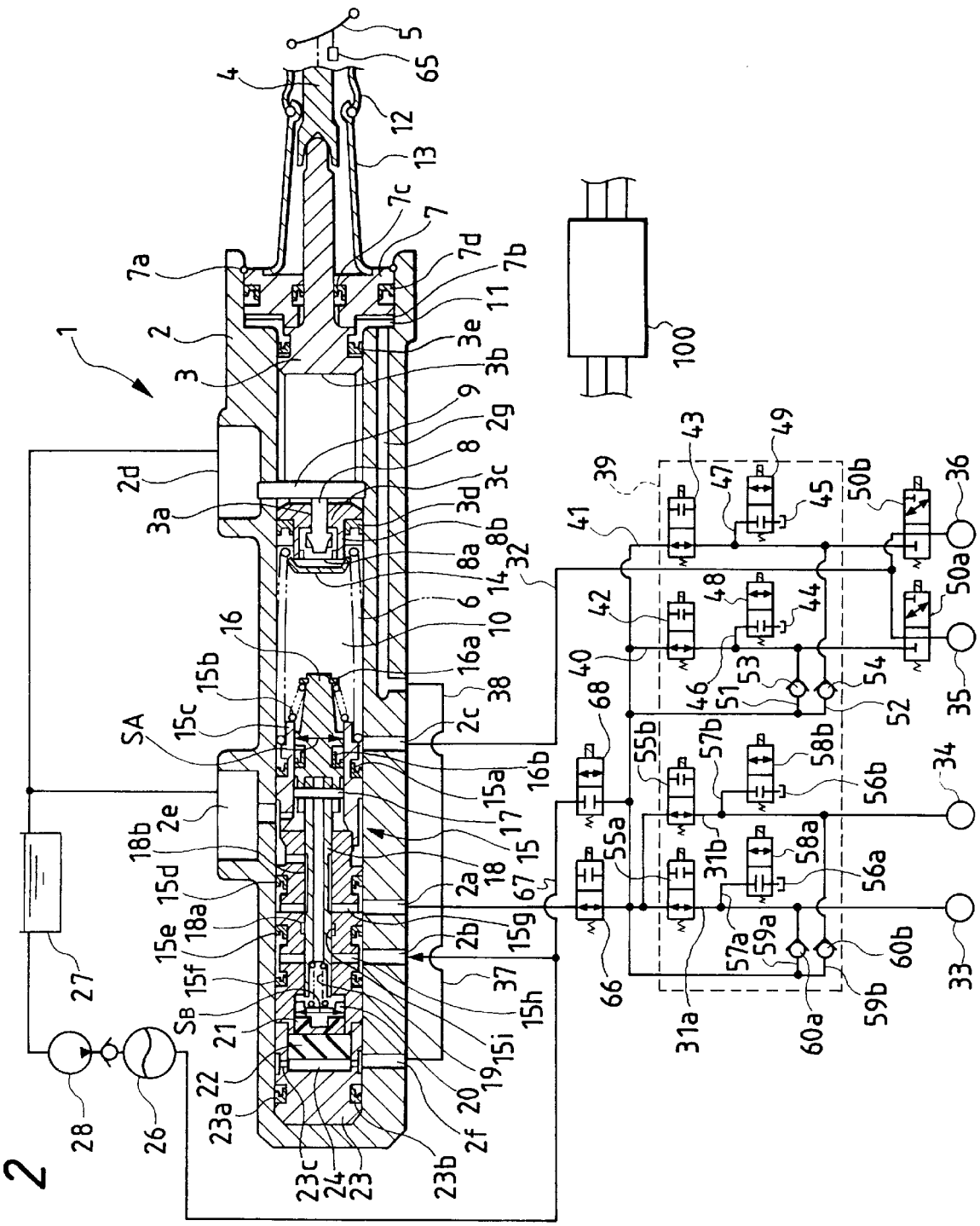
FIG. 2 is a systematic diagram showing a vehicle brake control unit according to a second embodiment of the invention.

FIG. 2 is a systematic diagram showing a vehicle brake control unit according to a second embodiment of the invention. In FIG. 2, parts corresponding functionally to those already described with reference to FIG. 1 are therefore designated by the same reference numerals or characters.

The second embodiment is different from the above-described first embodiment in its pressure control device 39 which is provided between the hydraulic booster 1 and the wheel brakes 33 to 36. A pair of change-over valves for controlling the pressure PM in the pressure chamber 10 and the regulator pressure PR are provided for the wheel brakes 35 and 36, respectively; more specifically, those change-over valves are arranged downstream of the pressure intensifying valves 42 and 43 and the pressure reducing valves 48 and 49. In addition, similarly as in the case of the front wheels, pressure intensifying pipe lines 31a and 31b, relief pipe lines 57a and 57b, and return pipe lines 59a and 59b are provided for the rear wheel brakes 33 and 34, respectively.

A noticeable specific feature of the second embodiment reside in that a pipe line between the regulator port 2a of the hydraulic booster 1 and the pressure control device 39 has a first electromagnetic valve 66, which is a normally open electromagnetic valve, and a pipe line 67 is provided between the accumulator 26 and the pressure control device 39, and it has a second electromagnetic valve 68, which is a normally closed electromagnetic valve.

The second embodiment operates as follows: When the control circuit 100 determines that an emergency braking operation has been carried out, it operates to cause the first electromagnetic valve 66 to close and the second electromagnetic valve 68 to open, so that the high-pressure brake fluid which is not adjusted is supplied from the accumulator 26 through the pipe line 67 and the second electromagnetic valve 68 to the wheel brakes 33 to 36.

The first and second electromagnetic valves 66 and 68 may be replaced with one two-position three-port type electromagnetic valve.

In the above-described embodiments, a stroke sensor provided for the brake pedal is employed as emergency-braking-operation detecting means; however, the invention is not limited thereto or thereby. That is, it may be replaced, for instance, with means using a pressure sensor adapted to detect the pressure in the pressure chamber of the hydraulic booster, or means using a pedalling-force sensor adapted to detect a force applied to a brake pedal, or means using the differential value of a vehicle speed which is calculated according to a detection output of a wheel speed sensor.

As was described above, in the vehicle brake control unit of the invention, the addition of the change-over valve to the conventional brake control unit makes it possible to increase the braking force in the emergency braking operation. The vehicle brake control unit of the invention is low in manufacturing cost, and simple in arrangement, and accordingly high in reliability.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle brake control unit comprising:

a pressure source for generating a pressure independently of operation of a brake operating member;

braking booster means for adjusting the pressure from said pressure source according to a force applied to the brake operating member to apply an adjusted pressure to wheel brakes;

emergency-braking-operation detecting means for detecting an emergency braking operation; and brake pressure change-over means for communicating said pressure source with the wheel brake when said emergency-braking-operation detecting means detects an emergency braking operation, said brake pressure change-over means being in fluid communication with the pressure source via the braking booster means;

said braking booster means comprising: a cylinder body into which the pressure is led from said pressure source; a regulator pressure chamber formed in said cylinder body; a spool member provided in said cylinder body, said spool member being moved axially to adjust the pressure of said pressure source upon receiving a brake operating force on one side through and the pressure in said regulator pressure chamber on the other side thereof; and a regulator port formed in said cylinder body, to which the adjusted pressure adjusted by said spool member is led, said regulator port being communicable with said wheel brakes; and wherein said brake pressure change-over means comprises a change-over valve which is provided between said regulator port and said regulator pressure chamber, and which selectively takes a first position to communicate said regulator pressure chamber with said regulator port and a second position to communicate said regulator pressure chamber with the outside and to isolate said regulator pressure chamber and said regulator port from each other.

2. A vehicle brake control unit comprising:

a pressure source for generating a pressure independently of operation of a brake operating member;

braking booster means for adjusting the pressure from said pressure source according to a force applied to the brake operating member to apply an adjusted pressure to wheel brakes;

emergency-braking-operation detecting means for detecting an emergency braking operation; and brake pressure change-over means for communicating said pressure source with the wheel brake when said emergency-braking-operation detecting means detects an emergency braking operation, said brake pressure change-over means being in fluid communication with the pressure source via the braking booster means;

said braking booster means comprising: a cylinder body into which the pressure is led from said pressure source; a regulator pressure chamber formed in said cylinder body; a spool member provided in said cylinder body, said spool member being moved axially to adjust the pressure of said pressure source upon receiving a brake operating force on one side thereof and the pressure in said regulator pressure chamber on the other side thereof; and a regulator port formed in said cylinder body, to which the adjusted pressure adjusted by said spool member is led, said regulator port being communicating with said wheel brakes; and wherein said brake pressure change-over means comprises a change-over valve which selectively takes a first position to communicate said wheel brakes with said regulator port and to isolate said wheel brakes from said pressure source, and a second position to communicate said wheel brakes with said pressure source, and to isolate said wheel brakes from said regulator port.

3. A vehicle brake unit, comprising:

a pressure source;

a cylinder body having an inlet port to which said pressure source is connected in which a high hydraulic pressure is stored, a regulator port to which wheel brakes are connected, and a drain port to which a reservoir is connected;

a regulator pressure chamber connected to said regulator port;

a sliding member which is slidably provided in said cylinder body, said sliding member being moved in one direction by a brake operating force to communicate said regulator port with said inlet port, and being moved in the other direction by a fluid pressure in said regulator pressure chamber to communicate said regulator port with said drain port;

a fluid pressure modulator coupled to a pipe line through which said regulator port is connected to said regulator pressure chamber, to adjust the fluid pressure in said regulator pressure chamber to a fluid pressure different from the fluid pressure in said regulator port;

emergency-braking-operation detecting means for detecting an emergency braking operation; and fluid-pressure-modulator driving means for driving said fluid pressure modulator according to a detection output of said emergency-braking-operation detecting means.

* * * * *